(12) United States Patent
Schalles et al.

(10) Patent No.: US 12,072,248 B2
(45) Date of Patent: Aug. 27, 2024

(54) THERMOMETER HAVING A DIAGNOSTIC FUNCTION

(71) Applicant: Endress+Hauser Wetzer GmbH+Co. KG, Nesselwang (DE)

(72) Inventors: Marc Schalles, Erfurt (NL); Pavo Vrdoljak, Nesselwang (DE)

(73) Assignee: Endress+Hauser Wetzer GmbH+Co. KG, Nesselwang (DE)

(*) Notice: Subject to any disclaimer, the term of this patent is extended or adjusted under 35 U.S.C. 154(b) by 0 days.

(21) Appl. No.: 18/305,526

(22) Filed: Apr. 24, 2023

(65) Prior Publication Data

US 2023/0258506 A1    Aug. 17, 2023

Related U.S. Application Data

(63) Continuation of application No. 17/258,006, filed as application No. PCT/EP2019/067759 on Jul. 2, 2019, now Pat. No. 11,662,255.

(30) Foreign Application Priority Data

Jul. 5, 2018 (DE) .................. 10 2018 116 309.6

(51) Int. Cl.
  *G01K 7/02*  (2021.01)
  *G01K 7/16*  (2006.01)
(52) U.S. Cl.
  CPC ............. *G01K 7/02* (2013.01); *G01K 7/16* (2013.01)

(58) Field of Classification Search
  CPC .................................. G01K 7/02; G01K 7/16
  See application file for complete search history.

(56) References Cited

FOREIGN PATENT DOCUMENTS

| DE | 102007058410 A1 | * | 6/2009 | ............ G01K 1/20 |
| DE | 102017100268 A1 | * | 7/2018 | ............ G01K 15/00 |

* cited by examiner

*Primary Examiner* — Mirellys Jagan
(74) *Attorney, Agent, or Firm* — Kelly J. Smith; Endress+Hauser (USA) Holding, Inc.

(57) ABSTRACT

A device for determining the temperature of a medium includes a temperature sensor with a resistance element placed in electrical contact using first and second connection lines, wherein the first connection line is divided into a first section and a second section. The first section faces the sensor element and is composed of a first material, and the second section faces away from the sensor element and is composed of a second material which differs from the first material. The second connection line is composed of the second material. The first section of the first connection line and at least one part of the second connection line form a first difference temperature sensor in the form of a thermocouple. The first and second connection lines are attached to the resistance element so that the first difference temperature sensor detects a temperature gradient at the location of the temperature sensor.

12 Claims, 3 Drawing Sheets

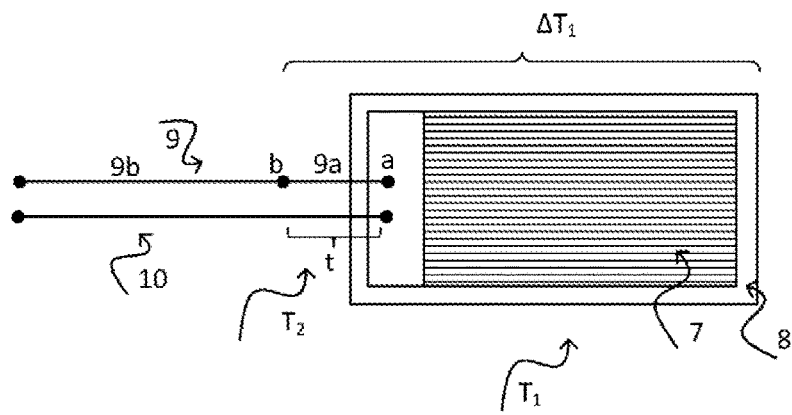
Fig. 2a
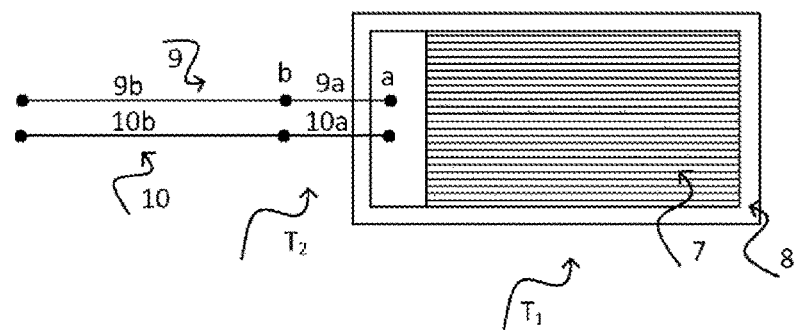
Fig. 2b
Fig. 2
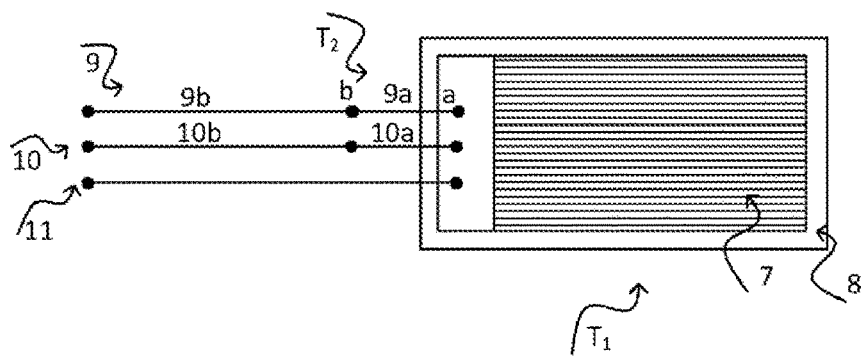
Fig. 3a
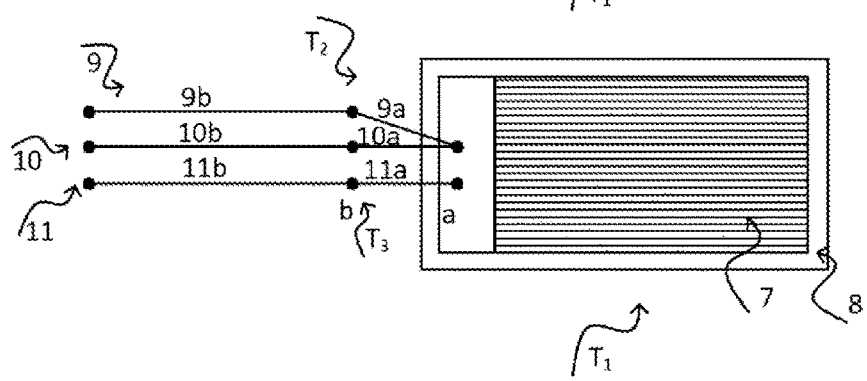
Fig. 3b
Fig. 3

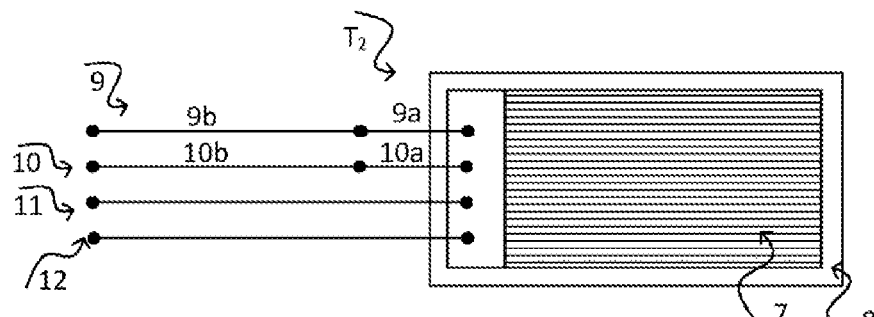
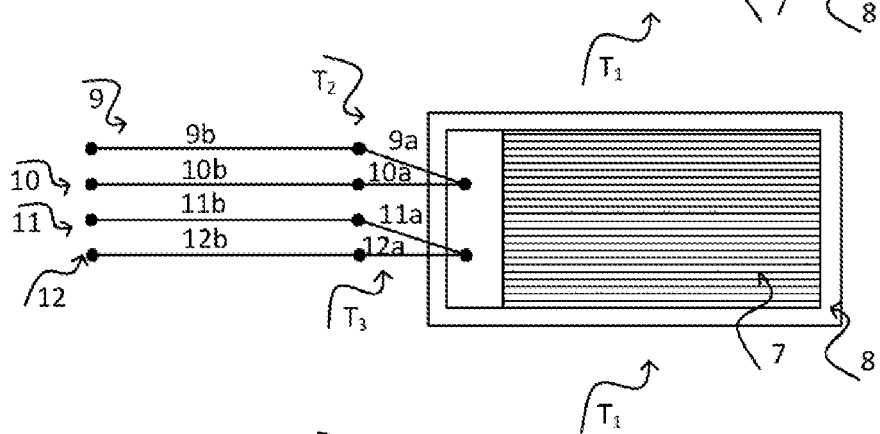
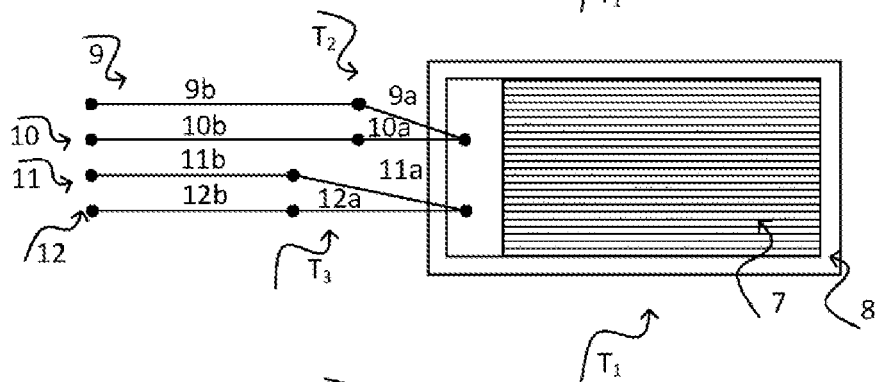
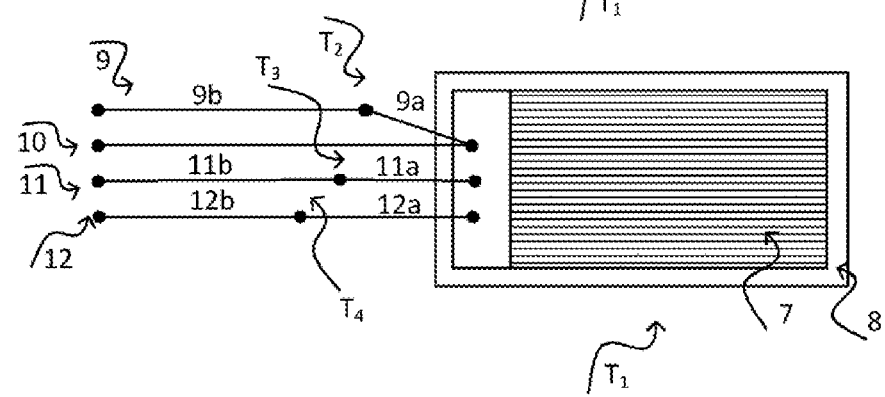
Fig. 4a
Fig. 4b
Fig. 4c
Fig. 4d
Fig. 4

THERMOMETER HAVING A DIAGNOSTIC FUNCTION

CROSS-REFERENCE TO RELATED APPLICATIONS

The present continuation application related to and claims the priority benefit of U.S. patent application Ser. No. 17/258,006, filed Jan. 5, 2021, German Patent Application No. 10 2018 116 309.6, filed on Jul. 5, 2018, and International Patent Application No. PCT/EP2019/067759, filed on Jul. 2, 2019, the entire contents of which are incorporated herein by reference.

TECHNICAL FIELD

The invention relates to a device for determining and/or monitoring the temperature of a medium.

BACKGROUND

Thermometers are known from the prior art in a great variety of embodiments. Thus, there are thermometers which use the expansion of a liquid, a gas or a solid with a known coefficient of expansion in order to measure temperature, or also others which relate the electrical conductivity of a material, or a quantity derived therefrom, to the temperature, such as electrical resistance when using, for example, resistance elements, or the thermoelectric effect in the case of thermocouples. On the other hand, radiation thermometers, in particular pyrometers, use the heat radiation of a substance to determine its temperature. The underlying measurement principles have each been described in a variety of publications.

In the case of a temperature sensor in the form of a resistance element, so-called thin-film and thick-film sensors and so-called thermistors (also referred to as NTC thermistors) have become known, among others. In the case of a thin-film sensor, in particular a resistance temperature detector (RTD), for example, a sensor element provided with connecting wires and mounted on a carrier substrate is used, wherein the back side of the carrier substrate usually has a metal coating. As sensor elements, so-called resistance elements, for example, in the form of platinum elements, are used, which among other things are also commercially available under the designations PT10, PT100, and PT1000.

In the case of temperature sensors in the form of thermocouples, however, the temperature is determined by a thermovoltage which arises between the unilaterally connected thermo wires made of different materials. Thermocouples according to the DIN standard IEC584, e.g., thermocouples of type K, J, N, S, R, B, T, or E, are usually used as temperature sensors for temperature measurement. However, other pairs of materials, in particular those with a measurable Seebeck effect, are also possible.

The task of thermometers in process automation is to determine the temperature of a medium, or of a process medium, reliably and as accurately as possible. In practice, there is the problem that the temperature sensor used in each case is separated from the medium by a plurality of thermal resistors. Such thermal resistors come about, for example, as a result of the individual components of the thermometer and possibly as a result of the container in which the medium is located, e.g., a reservoir or a pipeline. Frequently, the temperature sensor is part of a so-called measuring insert which comprises a casing element, which surrounds a filler and the temperature sensor embedded therein. In this case, serial thermal resistors result, for example, as a result of the casing and the filler.

If the thermometer also comprises, for example, a protective tube, further serial thermal resistors arise as a result of the protective tube itself, as well as the thermal coupling between the protective tube and the measuring insert. The choice of the length of the protective tube and of the measuring insert plays a decisive role in achieving a thermal balance between the process medium and the environment or the thermometer. If the protective tube and/or the measuring insert are/is too short, a temperature gradient may occur in the region of the temperature sensor. Such a temperature gradient depends on the one hand on the difference in the temperature of the medium or the process temperature, as the case may be, and the ambient temperature. On the other hand, however, the thermal conductivities of the respectively used components of the thermometer, the thermal couplings between the individual components and different process parameters, such as a flow rate of the process medium or the like, also play a decisive role.

A further cause of the occurrence of temperature gradients in the region of the temperature sensor is the formation of deposition layers and/or corrosion on the thermometer, e.g., on the protective tube or measuring insert, in particular in the region of the temperature sensor. The formation of deposits or the occurrence of corrosion leads to a change, in particular a deterioration, of the thermal coupling between the medium and the component of the thermometer respectively coming into contact with the medium, e.g., the protective tube or casing element.

Due to such temperature gradients in the region of the temperature sensor, considerable falsifications of measured values can occur independently of the exact cause of the gradient.

In order to avoid such falsifications of measured values, determining the true temperature value using three equidistant temperature sensors (Klaus Irrgang, Lothar Michalowsky has become known, for example: Temperaturmesspraxis [Temperature Measurement Practice], ISBN-13: 978380272204). However, this approach requires a comparatively complex construction and signal evaluation.

DE102014119593A1 discloses a thermometer that enables a temperature gradient to be detected along the connection lines. A resistance element in the so-called 4-conductor circuit is used as the temperature sensor. On one of the connecting wires, one piece of the connection line is replaced by another material, so that a differential thermocouple is formed from this and a further connection line. As soon as a temperature gradient occurs at the connecting wire consisting of two elements or two materials, a thermovoltage arises which gives information about the temperature gradient along the connecting wires. However, this temperature gradient only relates to the extension direction of the connecting wires. No direct statements can be made about any temperature gradients occurring directly in the region of the temperature sensor.

SUMMARY

The object of the present invention is therefore to specify a thermometer with the highest possible measurement performance, in particular with high measuring accuracy.

The object is achieved by the device according to claim 1. Advantageous embodiments are respectively specified in the dependent claims.

The object underlying the invention is achieved by a device for determining and/or monitoring the temperature of a medium, comprising a temperature sensor having a temperature-sensitive sensor element, which is electrically contacted via at least a first connection line and a second connection line. The first connection line is divided into a first section and a second section, wherein the first section which faces the sensor element consists of a first material, and wherein the second section which faces away from the sensor element consists of a second material which differs from the first material, while the second connection line likewise consists of the second material. The first section of the first connection line and at least a part of the second connection line then form a first difference temperature sensor in the form of a thermocouple.

According to the invention, the first difference temperature sensor is in principle a heat flow sensor according to the thermoelectric principle, by means of which a temperature gradient or heat flow at the location of the temperature sensor can be detected. If a temperature gradient occurs in the region of the temperature sensor, a measured value falsification of the temperature values determined by means of the temperature sensor occurs. In this case, a thermovoltage can be detected by means of the first difference temperature sensor. Advantageously, the temperature gradient can thus be detected directly at the location of the temperature sensor, i.e., at the location at which the temperature is determined and/or monitored. On the one hand, the two first sections of the first and second connection lines can be directly connected to one another and jointly attached to the temperature sensor. In this case, a first temperature sensor in the form of a thermocouple is especially suitable. It is also possible for the first and second connection lines to be attached separately to the temperature sensor. In the second case, the first sections of the first and second connection lines can then be electrically connected to one another by means of the temperature sensor, for example.

The two connection lines serve on the one hand for contacting the temperature sensor. At least the first section of the first connection line and at least a part of the second connection line simultaneously form the first difference temperature sensor by means of which a heat flow in the region of the temperature sensor can be detected.

In one embodiment, the temperature-sensitive sensor element of the temperature sensor is a resistance element. Depending on the type and design of the resistance element, the first and second connection lines, or the first sections of the first and second connection lines, can then be attached, for example, directly to the resistance element or also to a substrate on which the resistance element is arranged. The contacting can thus take place, for example, both via the sensor element and via a substrate on which the sensor element is arranged. It is likewise possible to arrange at least a partial region of at least one connection line, in particular the first part of at least one of the connection lines, on the substrate. In the case of an embodiment of the resistance element as a thin-film or thick-film sensor, the at least one partial region, arranged on the substrate, of at least one of the connection lines can then advantageously be produced together with the sensor element in a thin-film or thick-film method.

In a further embodiment of the device, the second connection line is divided into a first section facing the sensor element and a second section facing away from the sensor element. In this case, the first difference temperature sensor is formed by the first sections of the first and second connection lines. In contrast, the second sections of the first and second connection lines can be so-called extension wires which can be connected to the first sections of the two connection lines.

A particularly preferred embodiment includes the first section of the first connection line and the first section of the second connection line or at least the part of the second connection line being dimensioned in such a way, in particular wherein a length, a cross-sectional area, and/or a material are/is selected in such a way, that values for a first heat flow through the first section of the first connection line and/or through the first connection line and for a second heat flow through the first section of the second connection line, the part of the second connection line and/or the second connection line are essentially equal.

By appropriately dimensioning the connection lines or sections of the connection lines, the heat flows along the two connection lines being essentially identical can be achieved. In this way, the falsification of the measured values by the first difference temperature sensor can be significantly reduced. For example, the sections of the connection lines that consist of the second material, in particular the second connection line and the second section of the first connection line, can be designed identically, while the first section of the first connection line is dimensioned appropriately. In the case of a division of the second connection line into a first and a second section, however, the first and second sections can, for example, also be dimensioned differently, while the second sections of the first and second connection lines are dimensioned identically. Many different variants are conceivable in this respect, all of which fall within the present invention.

It is advantageous if the first section of the first connection line and the first section of the second connection line have essentially the same length. This especially allows the first sections of the connection lines to be connected in a simple manner to the second sections forming the extension wires.

A further preferred embodiment includes the device comprising at least one third connection line for electrically contacting the temperature sensor. Many different embodiments are conceivable here, all of which fall within the present invention. Both the second and the third connection line can, for example, form the first difference temperature sensor with the first connection line. It is also conceivable to operate the temperature sensor in a so-called two-conductor circuit or three-conductor circuit.

With regard to an embodiment having three connection lines, it is advantageous if the third connection line is divided into a first section facing the sensor element and into a second section facing away from the sensor element, wherein the first section of the third connection line consists of the first material and a third material, wherein the second section of the third connection line consists of the second material, and wherein the first section of the third connection line and at least a part of the second connection line form a second difference temperature sensor in the form of a thermocouple. The second difference temperature sensor can then also be used for detecting a heat flow, in particular in the region of the temperature sensor. On the one hand, the first and second difference temperature sensors can be designed identically. However, it is also conceivable to design the two difference temperature sensors differently. For this purpose, for example, the first sections of the first and third connection lines can be dimensioned differently, e.g., with regard to the length, the cross section, or the material used in each case.

In a further particularly preferred embodiment, the device comprises at least a fourth connection line for electrically contacting the temperature sensor. Many different embodiments are also conceivable in this respect, all of which fall within the present invention. The second, the third or the fourth connection line can form the first difference temperature sensor with the first connection line, for example. The same considerations apply to an optionally present second difference temperature sensor. It is also conceivable to operate the temperature sensor in a so-called two-conductor, three-conductor, or four-conductor circuit.

It is advantageous if the fourth connection line is/are divided into a first section facing the sensor element and into a second section facing away from the sensor element, wherein the first section of the fourth connection line consists of the first, the third or a fourth material, wherein the second section of the fourth connection line consists of the second material, and wherein the first section of the fourth connection line and at least a part of the second or the third connection line form a third difference temperature sensor in the form of a thermocouple. The third difference temperature sensor can then also be used for detecting a heat flow, in particular in the region of the temperature sensor. On the one hand, the first, second and/or third difference temperature sensors can be designed identically. However, it is also conceivable to design at least two of the at least three difference temperature sensors differently. For this purpose, the first sections of the first, third and/or fourth connection lines can, for example, be dimensioned differently, e.g., with regard to the length, the cross section, or the material used in each case.

A preferred embodiment includes, for example, that a length of the first section of the third and/or the fourth connection line differs from the length of the first section of the first connection line.

In one embodiment, the device according to the invention comprises an electronics module which is designed to detect a first, a second and/or a third thermovoltage dropping at the first, the second and/or the third difference temperature sensor.

In this respect, it is advantageous if the electronics module is designed to determine a heat flow, in particular a heat dissipation, of the temperature sensor on the basis of the first, the second and/or the third thermovoltage. If, for example, no thermovoltage arises at the first, the second and/or the third difference temperature sensor, it can be concluded that no temperature gradient occurs in the region of the temperature sensor. The falsification of a measured value obtained by means of the temperature sensor for the temperature of the medium due to heat flows in the region of the temperature sensor can accordingly be ruled out.

It is also advantageous if the electronics module is designed to detect a deposit on a medium-contacting component of the thermometer, in particular on a protective tube, on the basis of the first, the second and/or the third thermovoltage. If deposits form on the thermometer in continuous operation, this has a possibly considerable influence on the thermal properties of the thermometer, in particular on the thermal coupling between the medium and the thermometer, and can thus be a cause of temperature gradients occurring in the region of the temperature sensor.

It is furthermore advantageous if the electronics module is designed to determine, on the basis of the first, second and/or third thermovoltages, a statement about a physical and/or chemical property of the medium, e.g., a flow rate, a flow velocity or a specific heat capacity, or a heat transfer coefficient, a heat flow of the medium or a change in the composition of the medium. In this case as well, a change in one of these variables causes a change in the thermal coupling between medium and thermometer and can thus be a cause of a temperature gradient occurring in the region of the temperature sensor.

BRIEF DESCRIPTION OF THE DRAWINGS

The invention is explained in more detail based upon the following drawings. The following are shown:

FIG. 2a shows a schematic representation of a thermometer according to the present disclosure with two connection lines in different one embodiment, FIG. 2b shows a schematic representation of a thermometer according to the present disclosure with two connection lines in different one embodiment, FIG. 3 includes FIG. 3a and FIG. 3b, FIG. 3a shows a schematic representation of a thermometer according to the present disclosure with three connection lines in different one embodiment, and FIG. 3b shows a schematic representation of a thermometer according to the present disclosure with three connection lines in another embodiment, FIG. 4 includes FIG. 4a, FIG. 4b, FIG. 4c, and FIG. 4d, FIG. 4a shows a schematic representation of a thermometer according to the present disclosure with four connection lines in different one embodiment, FIG. 4b shows a schematic representation of a thermometer according to the present disclosure with four connection lines in another embodiment, FIG. 4c shows a schematic representation of a thermometer according to the present disclosure with four connection lines in another embodiment, and FIG. 4d shows a schematic representation of a thermometer according to the present disclosure with four connection lines in another embodiment.

Figure 1:
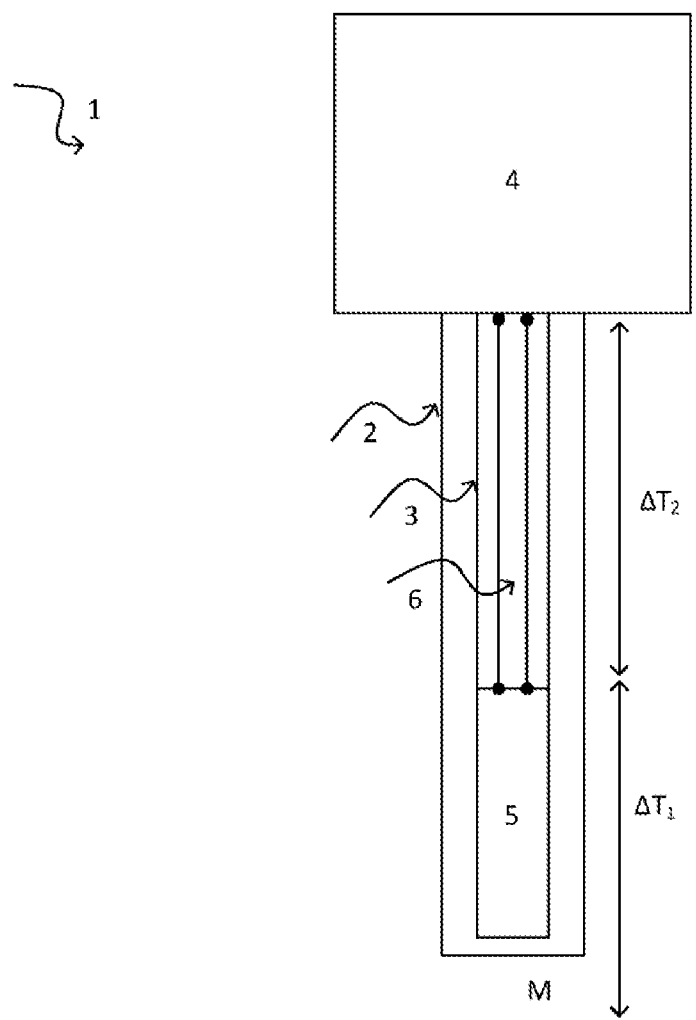
FIG. 1 shows a schematic representation of a thermometer according to the prior art with a temperature sensor in the form of a resistance element, FIG. 2 includes FIG. 2a and FIG. 2b.

In the figures, the same features are identified with the same reference signs.

DETAILED DESCRIPTION

FIG. 1 shows a schematic representation of a thermometer 1 with a dipping body 2, e.g., a protective tube, a measuring insert 3, and an electronics module 4 according to the prior art. The measuring insert 3 is introduced into the dipping body 2 and comprises a temperature sensor 5 which in the present case comprises a temperature-sensitive element in the form of a resistance element. The temperature sensor is electrically contacted via the connection lines 6 and connected to the electronics module 4. In other embodiments, the electronics module 4 can also be arranged separately from the measuring insert 3 and dipping body 2. In addition, the sensor element 5 need not necessarily be a resistance element, nor does the number of connection lines 6 used need necessarily be two. Rather, the number of connection lines 6 can be selected appropriately depending on the measurement principle used and the temperature sensor used.

As already explained, the measuring accuracy of a thermometer 1 depends to a large extent on the respective materials and on contacting means, in particular thermal contacting means, in particular in the region of the temperature sensor 5. The temperature sensor 5 is in thermal contact with the medium M indirectly, i.e., via the dipping body 2. The temperature sensor 5 is thus separated from the medium M by a plurality of thermal resistors. Depending on the process conditions and/or the respective structural design of the thermometer, no thermal equilibrium between the medium M and the thermometer may therefore be present at least temporarily and/or in part. As a result of the absence of a thermal equilibrium, temperature gradients ΔT1 or ΔT2 may arise, for example, in the region of the temperature sensor 5 or also along the connection lines 6, said temperature gradients falsifying the temperature values measured in each case with the temperature sensor 5 as a result of resulting heat flows.

Temperature gradients ΔT1 in the region of the temperature sensor 5 are particularly relevant in this context. The present invention therefore enables the detection of such temperature gradients. This leads to a significantly improved measuring accuracy of the thermometer.

A first embodiment of the thermometer according to the invention is shown in FIG. 2. A temperature sensor T1 in the form of a resistance element 7 applied to a substrate 8 is used for determining and/or monitoring the temperature T of the medium M. The temperature sensor T1 is electrically contacted by means of the two connection lines 9 and 10 and is thus operated in the so-called two-conductor circuit. In the present case, both connection lines 9 and 10 are attached directly to the resistance element 7. However, it should be noted at this point that all the contacting means known to the person skilled in the art for connecting the first temperature sensor T1 to the connection lines 9 and 10 are also possible and fall under the present invention.

The first connection line 9 is divided into a first section 9a and a second section 9b. The first section 9a consists of a first material, and the second section 9b and the second connection line 10 consist of a second material which differs from the first material. In this way, the first section 9a of the first connection line 9 and at least a part t of the second connection line 10 form a first difference temperature sensor T2 in the form of a thermocouple. The two materials for the first section 9a of the first connection line 9 and the second section 9b of the first connection line and for the second connection line 10 are selected in such a way that a thermovoltage can be detected by means of T2 due to a temperature difference between the points a and b and the different thermovoltages forming accordingly in the sections 9a and t due to the thermoelectric effect.

The first section 9a of the first connection line 9 is preferably short in comparison to the total length of the first connection line 9; for example, the length of the first section 9a of the first connection line 9 is in the range of a few millimeters or centimeters. In this way, it can be ensured that the values determined by means of the first difference temperature sensor T2 reflect a temperature gradient ΔT1 in the region of the temperature sensor T1 as far as possible.

In the example shown in FIG. 2a, the first connection line 9 and the second connecting line 10 are separately attached to the resistance element. The first section 9a of the first connection line 9 and the part t of the second connection line 10 are thus indirectly connected via the resistance element 7. In another embodiment, however, the first section 9a of the first connection line 9 and the part t of the second connection line 10 could also be connected directly to one another and then attached to the temperature sensor T1. Of course, instead of the temperature sensor T1 shown by way of example here for all figures with a sensor element in the form of a resistance element 7, other temperature sensors well known to the person skilled in the art can also be used and also fall under the present invention.

In the embodiment shown in FIG. 2b, the second connection line 10 is also divided into a first section 10a and a second section 10b. In this case, the first difference temperature sensor T2 is formed by the first sections 9a and 10a of the first connection line 9 and the second connection line 10. According to FIG. 2b, but not necessarily, the two first sections 9a and 10a of the two connection lines 9 and 10 are of the same length. In this case, the second sections 9b and 10b of the first connection line 9 and of the second connection line 10 are extension wires, preferably similarly designed extension wires. However, in the case of the embodiment according to FIG. 2a, it is also advantageous if the second section 9b of the first connection line 9 and the second connection line 10 are of similar design.

FIG. 3 shows by way of example two different embodiments of a device 1 according to the invention in which the temperature sensor T1 is connected by means of three connection lines 9-11. The two embodiments shown are to be understood only as examples. There are numerous alternative embodiments of an arrangement according to the invention with three connection lines 9-11 which are likewise possible.

According to FIG. 3a, the temperature sensor T1 is connected by means of the three connection lines 9-11. Apart from the third connection line 11, this embodiment corresponds to the variant shown in FIG. 2b. Elements already explained are therefore not discussed again at this point. By using three connection lines 9-11, the temperature sensor T1 can advantageously be operated in the so-called three-conductor circuit. The third connection line 11 for this embodiment preferably consists of the same material as the second connection line 10 and as the second section 9b of the first connection line 9.

FIG. 3b shows another exemplary embodiment of a device 1 according to the invention having three connection lines 9-11. In contrast to FIG. 3a, the first sections of the first connection line 9a and of the second connection line 10b which form the first difference temperature sensor T2 are directly connected to one another. Moreover, the third connection line 11 is also divided into a first section 11a and a second section 11b. The material of the first section 11a of the third connection line 11 differs from the material of the first section 10a of the second connection line 10 in such a way that it forms a second difference temperature sensor T3, also in the form of a thermocouple. However, the second difference temperature sensor T3 can also be formed analogously to that shown in FIG. 2a without a division of the second connection line 10 into two sections 10a and 10b. In this case, the materials of which the first sections 9a and 11a of the first connection line 9 and of the third connection line 11 may be both identical, i.e., also different.

Four different embodiments of a thermometer 1 according to the invention, which are likewise to be understood as exemplary, with 4 connection lines 9-12 are lastly shown in FIG. 4. The variant shown in FIG. 4a corresponds largely to the variant shown in FIG. 3a. Elements already explained are therefore also not discussed again here. In addition to FIG. 3a, the embodiment according to FIG. 4b comprises a fourth connection line 12. By using four connection lines 9-12, the temperature sensor T1 can advantageously be operated in the so-called four-conductor circuit. The fourth connection line 12 for this embodiment preferably consists of the same material as the second connection line 10 and the third connection line 11 and as the second section 9b of the first connection line 9.

Another possible embodiment is shown in FIG. 4b. With regard to the first connection line 9 and the second connection line 10, this embodiment corresponds to that shown in FIG. 3b. The fourth connection line 12 here, just as other connection lines 9-11, is divided into a first section 12a and a second section 12b. The third connection line 11 and the fourth connection line 12 are designed analogously to the first connection line 9 and the second connection line 10, wherein the first sections 11a and 12a of the third connection line 11 and of the fourth connection line 12 form the second difference temperature sensor T3. In other embodiments, the first differential temperature sensor T2 and the second differential temperature sensor T3 may also be designed in accordance with the embodiments from FIG. 2a or 2b.

For the embodiment according to FIG. 4b, it is assumed by way of example that the materials of the second section 9b of the first connection line 9, of the second connection line 10, of the second section 11a of the third connection line 11, and of the fourth connection line 12 are identical, while the first sections 9a and 11a of the first connection line 9 and of the third connection line 9 and 11 differ therefrom. In this case, the materials of the first sections 9a and 11a can again respectively be identical or different.

In principle, similarly to the case of FIG. 3, the first difference temperature sensor T2 and the second difference temperature sensor T3 can be designed identically or differently. For example, a difference between the first difference temperature sensor T2 and the second difference temperature sensor T3 may be achieved by a different length of the first sections 9a and 10a of the first connection line 9 and of the second connection line 10 and the first sections 11a and 12a of the third connection line 11 and the fourth connection line 12 as shown in FIG. 4c. A variation of the cross sections of the sections 9a-12a is likewise conceivable.

A further exemplary embodiment is the subject matter of FIG. 4d. With regard to the first connection line 9 and the second connection line 10, this embodiment likewise corresponds to that shown in FIG. 3b. The third connection line 11 and the fourth connection line 12 are also respectively divided into two sections 11a and 11b and 12a and 12b but separately connected to the resistance element 7. Such first sections 9a, 11a and 12a of the first connection line 9, the third connection line 11 and the fourth connection line 12 are of different lengths and each forms a first difference temperature sensor T2, a second difference temperature sensor T3 and a third difference temperature sensor T4 with a part t of the second connection line corresponding to the respective length of the first sections 9a, 11a, 12a.

For the embodiment in FIG. 4d, it is assumed by way of example that the materials of the second sections 9b, 11b and 12b of the first connection line 9, the third connection line 11 and the fourth connection line 12 as well as of the second connection line 10 are identical, while the first sections 9a, 11a and 12a of the first connection line 9, the third connection line 11 and the fourth connection line 12 differ therefrom. In this case, the materials of the first sections 9a, 11a and 12a can again be identical or at least partially different in each case.

It is pointed out that the individual embodiments described in connection with individual figures can be combined with one another as desired, and numerous other embodiments of the present invention not shown here are likewise possible.

The invention claimed is:

1. A device for determining or monitoring the temperature of a medium, comprising:

a temperature sensor having a temperature-sensitive sensor element that is electrically contacted via at least a first connection line and a second connection line, wherein the first connection line is divided into a first section and a second section, wherein the first section, which faces the sensor element consists of a first material, wherein the second section which faces away from the sensor element, consists of a second material that differs from the first material, wherein the second connection line consists of the second material, wherein the first section of the first connection line and at least a part of the second connection line form a first difference temperature sensor in the form of a thermocouple, wherein the temperature-sensitive sensor element of the temperature sensor is a resistance element, and wherein the first connection line and the second connection line are directly attached to the resistance element or to a substrate on which the resistance element is arranged so that the first difference temperature sensor is embodied to detect a temperature gradient directly at the location of the temperature sensor.

2. The device of claim 1, wherein the first section of the first connection line and a first section of the second connection line or at least the part of the second connection line are dimensioned in such a way that values for a first heat flow through the first section of the first connection line or through the first connection line and for a second heat flow through the first section of the second connection line, the part of the second connection line or the second connection line are equal.

3. The device of claim 1, wherein the first section of the first connection line and a first section of the second connection line have the same length.

4. The device of claim 1, further comprising at least a third connection line for electrically contacting the temperature sensor.

5. The device of claim 4, wherein the third connection line is divided into a first section facing the sensor element and into a second section facing away from the sensor element, wherein the first section of the third connection line consists of the first material or a third material, wherein the second section of the third connection line consists of the second material, and wherein the first section of the third connection line and at least the part of the second connection line form a second difference temperature sensor in the form of a thermocouple.

6. The device of claim 5, further comprising at least a fourth connection line for electrically contacting the temperature sensor.

7. The device of claim 6, wherein the fourth connection line is divided into a first section facing the sensor element and into a second section facing away from the sensor element, wherein the first section of the fourth connection line consists of the first material, the third material or a fourth material, wherein the second section of the fourth connection line consist of the second material, and wherein the first section of the fourth connection line and at least the part of the second connection line or of a part of the third connection line form a third difference temperature sensor in the form of a thermocouple.

8. The device of claim 7,
wherein a length of the first section of the third connection line or of the fourth connection line differs from the length of the first section of the first connection line.

9. The device of claim 8,
further comprising an electronics module designed to detect a first, a second or a third thermovoltage dropping at the first difference temperature sensor, the second difference temperature sensor or the third difference temperature sensor.

10. The device of claim 9,
wherein the electronics module is designed to determine a heat flow of the temperature sensor on the basis of the first, the second or the third thermovoltage.

11. The device of claim 9,
wherein the electronics module is designed to detect a deposit on a medium-contacting component of a thermometer on the basis of the first, the second or the third thermovoltage.

12. The device of claim 9,
wherein the electronics module is designed to determine, on the basis of the first, the second or the third thermovoltage, a statement about a physical or chemical property of the medium.

* * * * *